United States Patent
Cho et al.

(10) Patent No.: US 8,045,104 B2
(45) Date of Patent: Oct. 25, 2011

(54) IN-PLANE SWITCHING MODE LIQUID CRYSTAL DISPLAY AND METHOD FOR MANUFACTURING THE SAME, COMPRISING FIRST AND SECOND BLACK MATRIX LINES

(75) Inventors: Suk Ho Cho, Suwon-si (KR); Su Jung Park, Janggi-dong (KR); Jin Ho Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 621 days.

(21) Appl. No.: 11/513,271

(22) Filed: Aug. 31, 2006

(65) Prior Publication Data

US 2007/0052900 A1    Mar. 8, 2007

(30) Foreign Application Priority Data

Aug. 31, 2005  (KR) .................. 10-2005-0080970
Jan. 31, 2006  (KR) .................. 10-2006-0009271

(51) Int. Cl.
*G02F 1/1333*    (2006.01)
*G02F 1/1343*    (2006.01)
(52) U.S. Cl. .................. 349/110; 349/141; 349/146
(58) Field of Classification Search .................. 349/110, 349/139–148, 187–192
See application file for complete search history.

(56) References Cited

U.S. PATENT DOCUMENTS

| | | | |
|---|---|---|---|
| 5,907,380 A * | 5/1999 | Lien | 349/141 |
| 6,088,070 A * | 7/2000 | Ohtani et al. | 349/38 |
| 6,538,713 B1 * | 3/2003 | Yanagawa et al. | 349/146 |
| 6,630,971 B1 * | 10/2003 | Woo et al. | 349/141 |
| 6,937,312 B2 * | 8/2005 | Kadotani et al. | 349/141 |
| 7,087,928 B2 * | 8/2006 | Shimizu et al. | 257/57 |
| 7,253,856 B2 * | 8/2007 | Kim et al. | 349/110 |
| 7,423,716 B2 * | 9/2008 | Konno et al. | 349/141 |
| 7,483,106 B2 * | 1/2009 | Ito et al. | 349/141 |
| 2002/0051101 A1 * | 5/2002 | Kurahashi et al. | 349/43 |
| 2004/0227891 A1 * | 11/2004 | Hirota | 349/141 |
| 2005/0046779 A1 * | 3/2005 | Sumi et al. | 349/155 |

* cited by examiner

*Primary Examiner* — Mark Robinson
*Assistant Examiner* — Paisley L Arendt
(74) *Attorney, Agent, or Firm* — Birch, Stewart, Kolasch & Birch, LLP

(57) ABSTRACT

A liquid crystal display and a method of manufacturing the same that can reduce the increase in the black level due to light leakage, without reducing the aperture ratio while improving the contrast ratio. The liquid crystal display includes a TFT array substrate comprising a data line, a pixel electrode and a common electrode, and the data line, the pixel electrode and the common electrode have at least one bent structure; a color filter array substrate opposite to the TFT array substrate, the color filter array substrate comprising a black matrix covering an area corresponding to at least the data line and the common electrode; and a liquid crystal layer formed between the TFT array substrate and the color filter array substrate, wherein the black matrix comprises a first black matrix line covering an area where light leakage is minimal, and a second black matrix line covering an area where light leakage is excessive, the second black matrix having a line width larger than a line width of the first black matrix.

17 Claims, 7 Drawing Sheets

(a)

(b)            (c)

IN-PLANE SWITCHING MODE LIQUID CRYSTAL DISPLAY AND METHOD FOR MANUFACTURING THE SAME, COMPRISING FIRST AND SECOND BLACK MATRIX LINES

This Nonprovisional Application claims priority under 35 U.S.C. §119(a) of Patent Application Nos. 10-2005-0080970 and 10-2006-0009271 filed in Korea on Aug. 31, 2005 and Jan. 31, 2006, respectively, the entire contents of which are hereby incorporated by reference.

BACKGROUND OF THE INVENTION

1. Field of the Invention

The invention relates to a liquid crystal display and a method for manufacturing the same, and more particularly, to an in-plane switching (IPS) mode liquid crystal display and a method for manufacturing the same.

2. Description of the Background Art

A liquid crystal display changes the molecular arrangement of the liquid crystal material by controlling the intensity of an electric field by applying different potentials to a pixel electrode and a common electrode encompassing a liquid crystal layer having dielectric anisotropy. A typical display includes a color filter array substrate in which a common electrode, a color filter, a black matrix, etc. are formed, and a TFT array substrate in which a switching element, a pixel electrode, etc. are formed. A desired image is presented by adjusting the amount of light that is transmitted to a color filter array substrate.

Liquid crystal displays mainly are thin film transistor liquid crystal displays (TFT LCDs) that use a thin film transistor (TFT) element as a switching element.

Recently, an in-plane switching mode liquid crystal display has been used in which the viewing angle is widened by forming a pixel electrode and a common electrode on a TFT array substrate, which is in the same plane, and applying an electric field for driving the liquid crystal in a horizontal direction. Furthermore, there has been introduced an in-plane switching mode of obtaining a wider viewing angle while addressing defects of contrast ratio (C/R) and response speed while preventing a color shift phenomenon by deforming side surfaces of the common electrode and the pixel electrode in a bent form.

However, in the related art liquid crystal display, when a side surface of a pixel area has a bent structure to correspond to a form of the common electrode and the pixel electrode, a step in which a rubbing processing is well performed and a step in which a rubbing processing is not well performed are inevitably generated in a side surface of a pixel area. This phenomenon depends on the bent structure and the rubbing condition after performing rubbing processing for the alignment film of the array substrate and the color filter array substrate.

In this case, when the rubbing processing is performed well, as when the liquid crystal material is uniformly aligned, light leakage is weak. In contrast, when rubbing processing is not performed well, as in a liquid crystal material that is not uniformly aligned, light leakage is excessive. Accordingly, because light leakage increases the black level, there is a problem in that the contrast ratio deteriorates.

A related art method covers all steps of the pixel area by increasing a line width of a black matrix that is formed on a color filter array substrate in order to remove the light leakage. However, in this method, the contrast ratio is improved due to the decrease in light leakage. However, since the line width of the black matrix is excessively widened, there is a problematic decrease of the aperture ratio resulting in that the brightness decreases. As a result, there is a need for technologies that optimally minimizes light leakage in in-plane switching mode liquid crystal displays.

SUMMARY OF THE INVENTION

Accordingly, an object of the present invention is to solve the problems and disadvantages of the background art.

An object of the present invention, in part, is to provide an in-plane switching mode liquid crystal display and a method for manufacturing the same that can prevent light leakage to the maximum without reducing an aperture ratio.

Another object of the present invention, in part, is to provide an in-plane switching mode liquid crystal display and a method for manufacturing the same that can improve the contrast ratio by reducing the increase in the black level due to light leakage.

According to an aspect of the present invention, in part, there is provided an in-plane switching mode liquid crystal display including: a TFT array substrate having a data line, a pixel electrode and a common electrode, and the data line, the pixel electrode and the common electrode have at least one bent structure; a color filter array substrate opposing the TFT array substrate, the color filter array substrate including a black matrix covering an area corresponding to at least the data line and the common electrode; and a liquid crystal layer formed between the TFT array substrate and the color filter array substrate, wherein the black matrix includes a first black matrix line covering an area in which light leakage is minimal, and a second black matrix line covering an area in which light leakage is excessive, the second black matrix having a line width larger than a line width of the first black matrix.

According to another aspect of the present invention, in part, there is provided an in-plane switching mode liquid crystal display including: first and second transparent insulating substrates opposing each other; a gate line formed over the first transparent insulating substrate; a data line intersecting the gate line, the data line having at least one bent structure; a common line disposed apart from and in parallel to the gate line; a common electrode branched from the common line, the common electrode having at least one bent structure parallel to the data line; a thin film transistor positioned at an intersection of the gate line and the data line, the thin film transistor having a gate electrode, a semiconductor layer, a source electrode, and a drain electrode; a pixel electrode alternately disposed with the common electrode, the pixel electrode having at least one bent structure, the pixel electrode being connected to the drain electrode; a black matrix formed over the second transparent insulating substrate to block light; a color filter over a pixel area that is defined by a black matrix; first and second alignment layers covering an entire surface of the first and second transparent insulating substrates and in which a rubbing processing is performed; and a liquid crystal layer between the first and second transparent insulating substrates, wherein the black matrix includes a first black matrix line covering an area in which light leakage is minimal, and a second black matrix line covering an area in which light leakage is excessive, the second black matrix ling having a line width larger than a line width of the first black matrix.

According to still another aspect of the present invention, in part, there is provided a method for manufacturing an in-plane switching mode liquid crystal display including: forming a TFT array substrate where each of a side line and a data line of each of a pixel electrode and a common electrode have at least one bent structure; forming a color filter array substrate so that a black matrix that is opposite to the TFT array substrate and defines a pixel area corresponding to the bent structure, wherein the black matrix includes a first black matrix line covering an area in which light leakage is minimal and a second black matrix line covering an area in which light leakage is excessive, and the second black matrix has a line width larger than that of the first black matrix; and forming a liquid crystal layer between the TFT array substrate and the color filter array substrate and assembling the two substrates.

Further details of the embodiments of the invention will be described in the detailed description and the drawings. It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Figure 1:
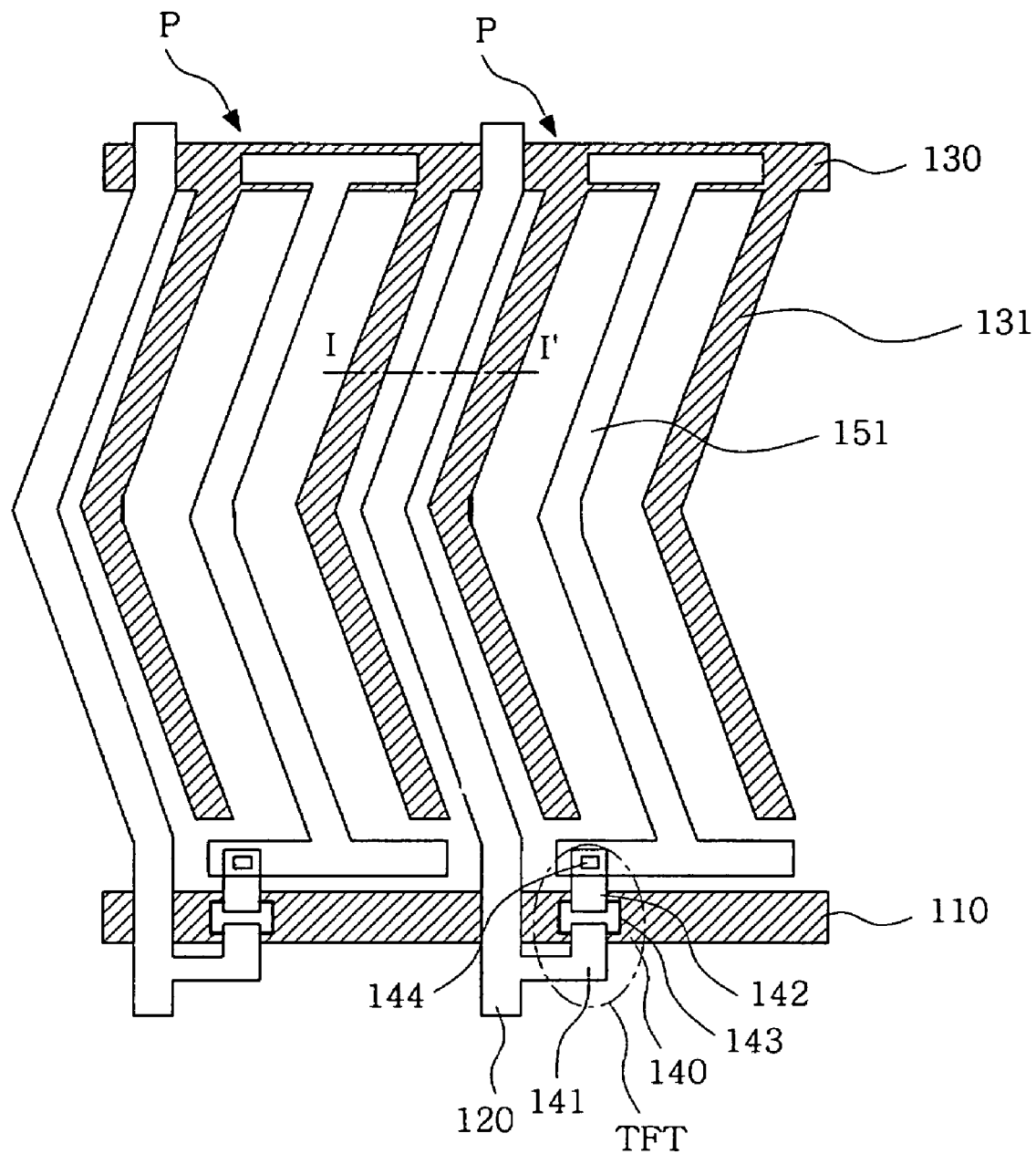
FIG. 1 shows a top plan view illustrating some of a pixel area of an in-plane switching mode liquid crystal display according to an embodiment.

Other objects and advantages of the invention will be apparent through descriptions or with reference to the accompanying drawings. Like reference numerals designate like elements throughout the specification.

Hereinafter, an in-plane switching mode liquid crystal display and a method for manufacturing the same according to an embodiment of the invention will be described in detail with reference to the accompanying drawings.

Figure 2:
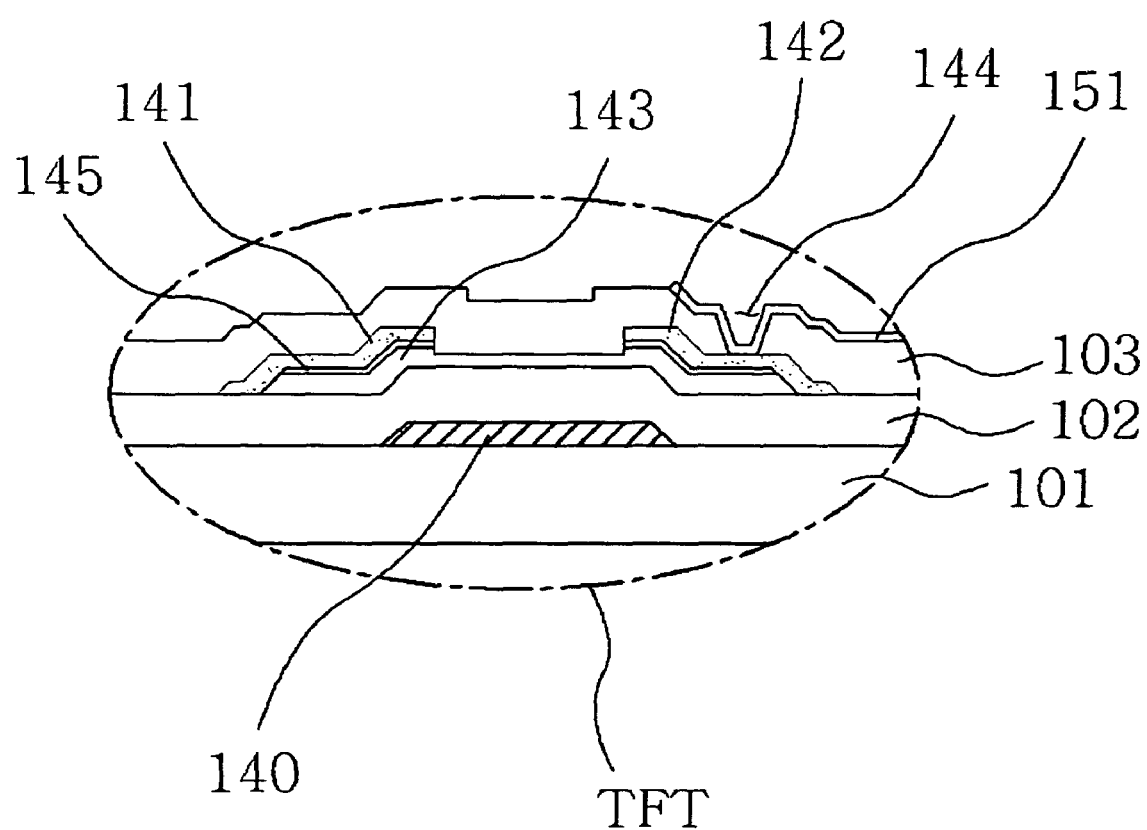
FIG. 2 shows a cross-sectional view illustrating in more detail a thin film transistor of FIG. 1.
Figure 3:
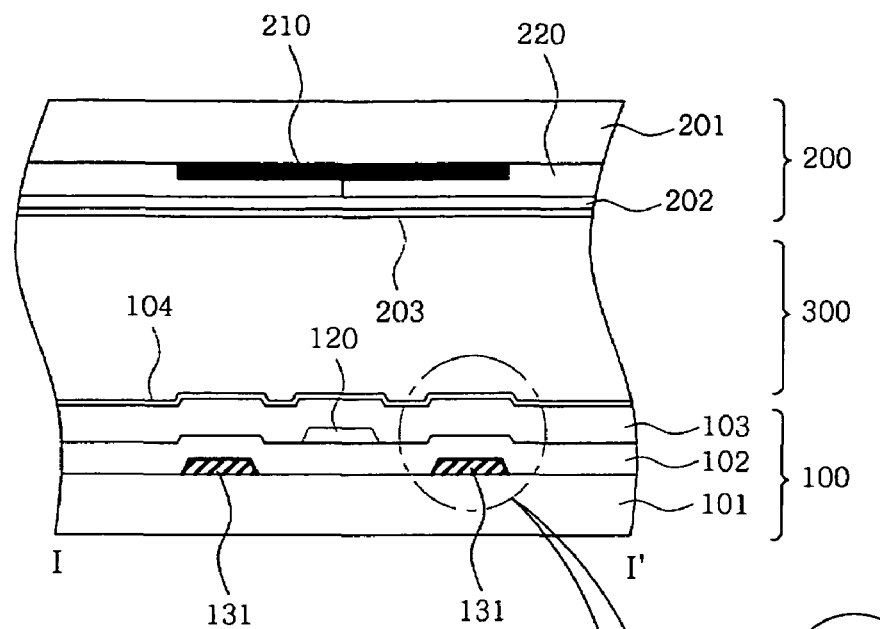
FIG. 3 shows a cross-sectional view schematically illustrating plane I-I' of FIG. 1.
Figure 3:
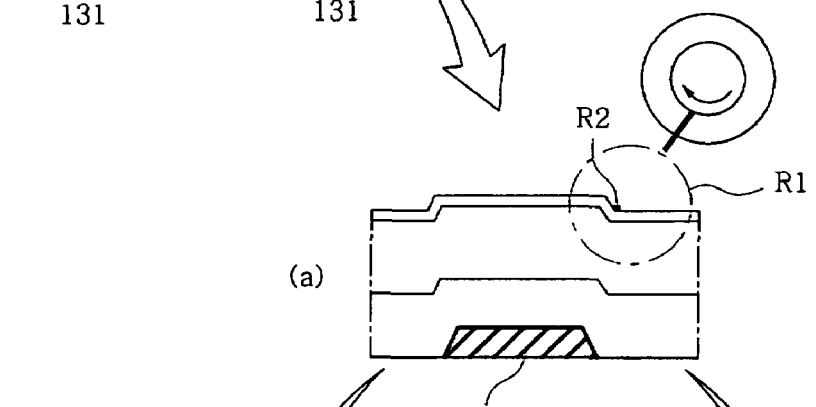
Figure 3:
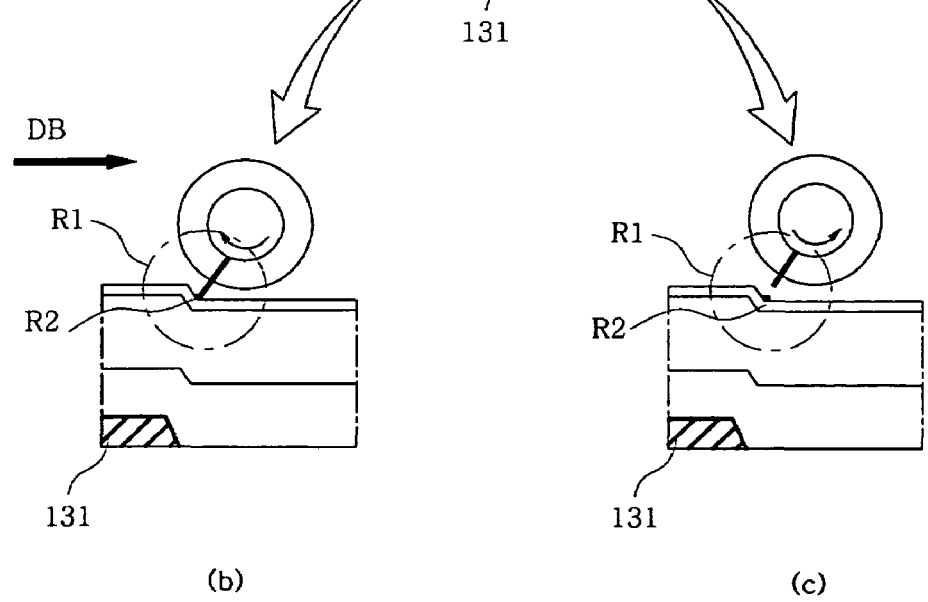

FIG. 1 shows a top plan view illustrating some of a pixel area of an in-plane switching mode liquid crystal display according to an embodiment. FIG. 2 shows a cross-sectional view illustrating in more detail a thin film transistor of FIG. 1. FIG. 3 shows a cross-sectional view schematically illustrating plane I-I' of FIG. 1.

Referring to FIGS. 1 to 3, the in-plane switching mode liquid crystal display according to an embodiment includes a TFT array substrate 100, a color filter array substrate 200, and a liquid crystal layer 300 that is formed therebetween.

The TFT array substrate 100 includes a first transparent insulating substrate 101, a gate line 110 and a data line 120 that are formed to intersect over the first transparent insulating substrate 101 to define a pixel area P, a common line 130 that is disposed apart from and in parallel to the gate line 110, a TFT that is positioned at an intersection of the gate line 110 and the data line 120, and a pixel electrode 151 and a common electrode 131 that are alternately disposed over the pixel area P.

Also, the gate line 110 and the common line 130 may be in parallel in a horizontal direction over the TFT array substrate 100, and the data line 120 has a bent structure in a vertical direction to be parallel to common electrodes 131 that are branched from the common line 130. As shown in FIG. 1, the configuration is "elbowed" or "zig-zag."

The pixel electrode 151 is alternately disposed with the common electrode 131 and is connected to a drain electrode 142 of the TFT through a contact hole 144. The drain electrode 142 and the pixel electrode 151 may be simultaneously formed without going through the contact hole 144. For example, at four mask processes, the drain electrode 142 and the pixel electrode 151 are integrally formed.

The TFT includes a gate electrode 140 that is integrally formed in the gate line 110, a semiconductor layer 143 that is formed over an upper part of the gate electrode 140, a source electrode 141 and a drain electrode 142 that are disposed apart from each other in an upper part of semiconductor layer 143, and an ohmic contact layer 145 that is formed over an interface between the source electrode 141, the drain electrode 142 and the semiconductor layer 143.

Here, the source electrode 141 is extends to an upper part of the gate electrode 140 from the data line 120. The drain electrode 142 is disposed apart in a vertical direction and a lateral direction from the source electrode 141 and connected to the pixel electrode 151 through the contact hole 144.

The pixel electrode 151 that is connected to the drain electrode 142 through the contact hole 144 and the common electrode 131 that is parallel thereto, are formed in the pixel area P and at this time, and the common electrode 131 is branched from the common line 130.

The gate insulating film 102 is formed in the upper part of the gate electrode 140, and the semiconductor layer 143 that may be made of an undoped amorphous silicon material is formed over the gate insulating film 102.

The ohmic contact layer 145 may be made of n+ hydrogenated amorphous silicon in which n-type impurities are doped at high concentration, and the ohmic contact layer 145 is formed over an interface between the source electrode 141, the drain electrode 142 and the semiconductor layer 143.

The color filter array substrate 200 includes a second transparent insulating substrate 201, a black matrix 210, a color filter 220, etc. over the second transparent insulating substrate 201.

The TFT array substrate 100 and the color filter array substrate 200 are covered with a passivation layer 103 and an overcoat layer 202, respectively that are made of an organic insulation material such as benzcyclobutene (BCB) or an inorganic insulation material such as silicon nitride film (SiNx). The first and second alignment layers 104 and 203 are formed and rubbing processing is performed in a front surface in which the TFT array substrate 100 and the color filter array substrate 200 are opposed to each other.

In such a structure, in four side edges of the pixel area P, a portion in which light leakage is excessive is asymmetrically generated because the liquid crystal is relatively non-uniformly arranged, depending on the rubbing conditions. Particularly, there may be a problem whether light leakage is excessive or minimal in a step area of the common electrode 131 that surrounds both sides of the pixel area P.

For example, as can be seen from FIG. 3(a), when rubbing processing is performed while a rubbing bar moves in a fixed rubbing advancing direction, liquid crystal is non-uniformly aligned in a part in which the rubbing hair sweeps down as in R1, and can be compared to a part in which the rubbing hair on the surface of the rubbing bar sweeps up based on the common electrode 131, whereby light leakage is excessive.

Elements to consider for estimating the degree of light leakage may include the TFT array substrate direction, etc. for specifying a rubbing condition such as the rubbing advancing direction, the rubbing rotational direction and the structure of the pixel area P. Also, it should be noted that the topology, i.e., height, of the various lines and electrodes are not the same to result in unequal degrees of rubbing over the array substrate. As a result, the degree of light leakage corresponds to underlying structure of the array substrate.

FIGS. 3(b)-(c) show cases of rotational rubbing in which a rubbing bar rotates clockwise and counterclockwise, respectively.

In FIG. 3(b), in which the rubbing rotational direction is clockwise, as the rubbing hair sweeps up in a step R1 including a lower edge R2, the rubbing processing is performed well and thus light leakage relatively decreases. That is, the clockwise rotation of the rubbing hair digs into the underlying structure to provide a good rubbing alignment. However, in FIG. 3(c) in which the rubbing rotational direction is counterclockwise, as the rubbing hair sweeps down in a step R1, a lower edge R2 in which rubbing processing is not performed well is generated and thus light leakage relatively increases. That is, the counterclockwise rotation of the rubbing hair inhibits full digging into the underlying structure so that the rubbing alignment may not be optimal.

Therefore, the black matrix 210 has a larger line width at a portion that is estimated as being where light leakage is comparatively excessive by estimating an asymmetrical light leakage portion depending on the rubbing condition such as rubbing advancing direction, rubbing rotational direction and a TFT array substrate direction defining a structure of the pixel area P.

Figure 4:
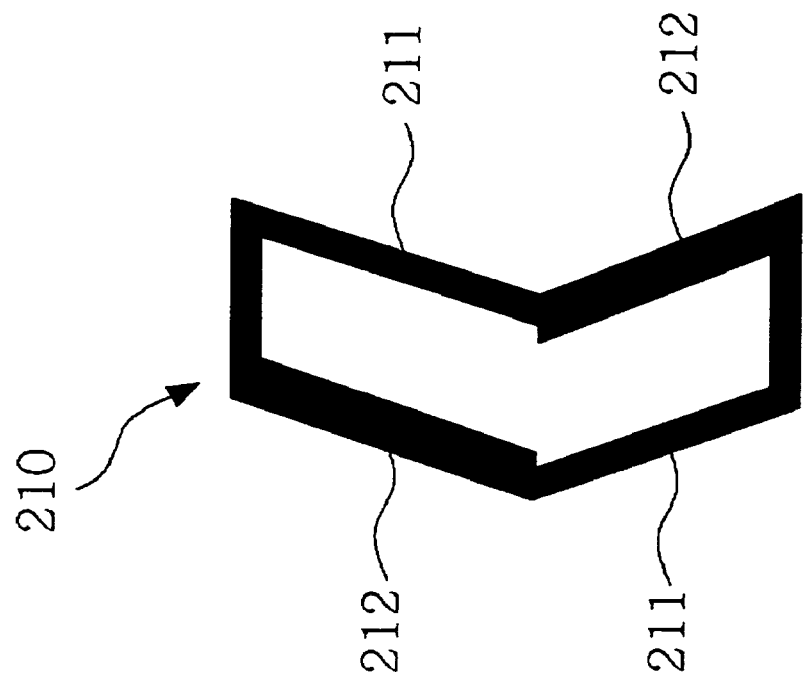
FIG. 4 shows a view illustrating a black matrix according to an embodiment.
Figure 4:
Figure 4:
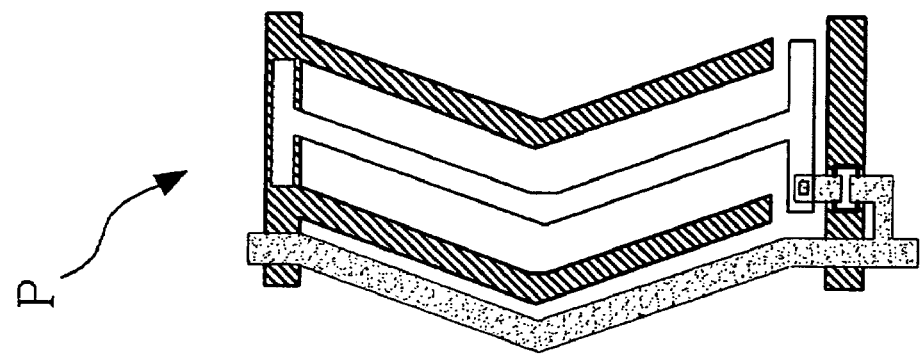

FIG. 4 shows a view illustrating a black matrix according to an embodiment of the invention.

Referring to FIG. 4, unlike a conventional case where a shape or all line widths corresponding to the pixel area P are equally formed, the black matrix 210 includes two first matrix lines 211 and two second matrix lines 212 having a line width larger than the first matrix line 211, and they are asymmetrical to each other. Furthermore, each of the first matrix lines 211 and the second matrix lines 212 are connected to each other with a predetermined angle to be opposite to each other and to correspond to the common electrode 131. At this time, as describe above, it means that the common electrode 131 corresponds to a bent portion that the first matrix line 211 and the second matrix line 212, which are connected to each other with a predetermined angle.

Here, the second matrix line 212 of the black matrix 210 is formed in a portion in which light leakage strongly generates because alignment of the liquid crystal layer 300 is non-uniform. Particularly, a line width of the second matrix line 212 and is expanded to the inside of the pixel area P, compared to that of the first matrix line 211 (see FIG. 3).

That is, it is estimated that a portion in which light leakage is strongly or weakly generated is asymmetric depending on the rubbing condition and structure of the pixel area P in four side edges of the pixel area P. Accordingly, the line width of the black matrix 210 is expanded at a position corresponding to a step of two pixel areas P having strong light leakage, after a light leakage portion is estimated based on the uniformity of liquid crystal alignment depending on the rubbing condition and structure of the pixel area P. The line width of the black matrix 210 is reduced and just remains in a position corresponding to a step of two pixel areas P where there is little or no light leakage.

In this way, in a portion in which light leakage is strongly generated, a maximum aperture ratio can be secured and a contrast ratio can be maximized through an asymmetrical structure in which the line width of the black matrix 210 is selectively expanded.

Figure 5:
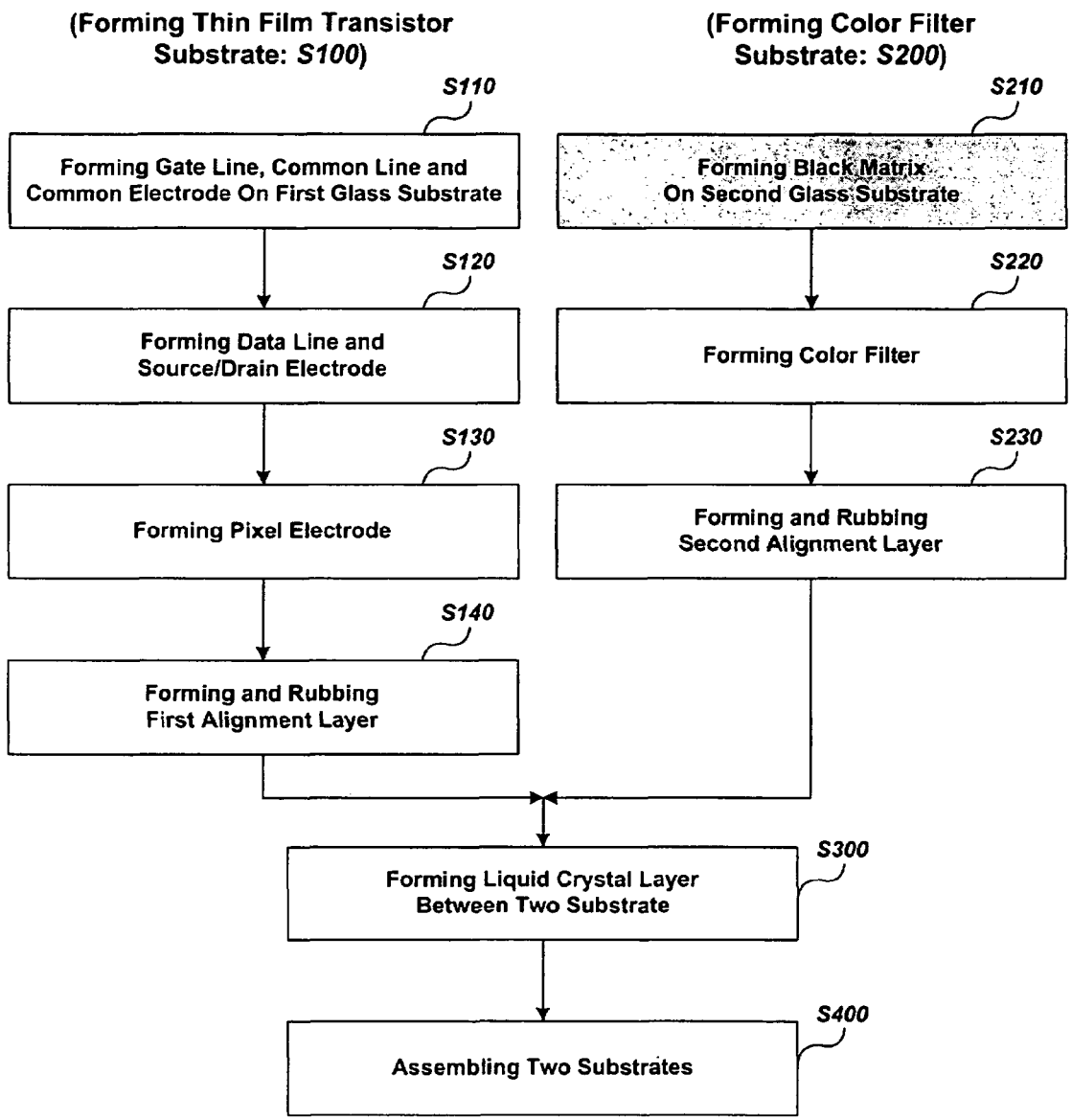
FIG. 5 shows a flowchart of operations of a method for manufacturing an in-plane switching mode liquid crystal display according to an embodiment.

FIG. 5 shows an operational flowchart for a method for manufacturing an in-plane switching mode liquid crystal display according to an embodiment of the invention.

Referring to FIG. 5, the method for manufacturing an in-plane switching mode liquid crystal display according to this preferred embodiment of the invention includes a step of forming a thin film transistor (S100), a step of forming a color filter array substrate (S200), a step of forming a liquid crystal layer (S300), and a step of assembling a substrate (S400).

First, the step of forming the thin film transistor (S100) includes forming a gate line 110 and a gate electrode 140 in one direction over a first transparent insulating substrate 101, and a process of forming a common line 130 and the common electrodes 131 that are branched from the common line 130 in order to surround a pixel area P (S110). A gate insulating film 102 is deposited over an entire surface of the first transparent insulating substrate 101 in order to cover the gate line 110, the common line 130 and the common electrodes 131.

Next, a data line 120 that defines a pixel area P is formed to be parallel to the common electrode 131 while intersecting the gate line 110. The TFT is formed (S120) by arranging a semiconductor layer 143 at an intersection of the gate line 110 and the data line 120, and arranging the source electrode 141 and the drain electrode 142 that are disposed apart from each other with the semiconductor layer 143 interposed between. The passivation layer 103 is formed over a front surface of the first transparent insulating substrate 101 in order to cover the data line 120 and the TFT.

Next, the pixel electrode 151 is alternately disposed with the common electrode 131. The pixel electrode 151 is connected to the drain electrode 142 of the TFT through the contact hole 144 (S130).

Then, the TFT array substrate 100 is completed by performing rubbing processing in the first alignment layer 104 after the first alignment layer 104 for covering an entire surface of the TFT array substrate 100 is formed (S140).

On the other hand, in a step of forming the color filter array substrate (S200), after the black matrix 210 is formed over the second transparent insulating substrate 201 (S210), the color filter 220 is formed (S220).

At this time, the black matrix 210 includes two first matrix lines 211 and two second matrix lines 212 having a line width larger than the first matrix line 211, and the black matrix 210 is formed, i.e., in a bent pattern. The first matrix line 211 and the second matrix line 212 are connected to each other with a predetermined angle to correspond to the common electrode 131, and a line width of the second matrix line 212 may be formed to expand to the inside of the pixel area P, compared to that of the first matrix line 211.

Furthermore, a the position of the second matrix line 212 and the first matrix line 211 of the black matrix 210 can be determined depending on a rubbing advancing direction DB, a rubbing rotational direction DR, etc. by considering the rubbing condition of the TFT array substrate 100. Essentially, in an area in which rubbing hair on a surface of a rubbing bar B sweeps down among steps of the pixel area P that is formed in the array substrate 100, and the liquid crystal is consequently non-uniformly arranged, light leakage is excessive and thus the second matrix line 212 is formed. In an area in which the rubbing hair on a surface of the rubbing bar B sweeps up, as liquid crystal is relatively uniformly arranged, light leakage is minimal, and thus the first matrix line 212 is formed.

Next, the second alignment layer 203 is formed over a front surface of the TFT array substrate 100 and the color filter array substrate 200, and the color filter array substrate 200 is then completed by performing rubbing processing thereon (S230).

Then, after the liquid crystal layer 300 is formed between the TFT array substrate 100 and the color filter array substrate 200 (S300), the TFT array substrate 100 and the color filter array substrate 200 are assembled (S400).

Figure 6:
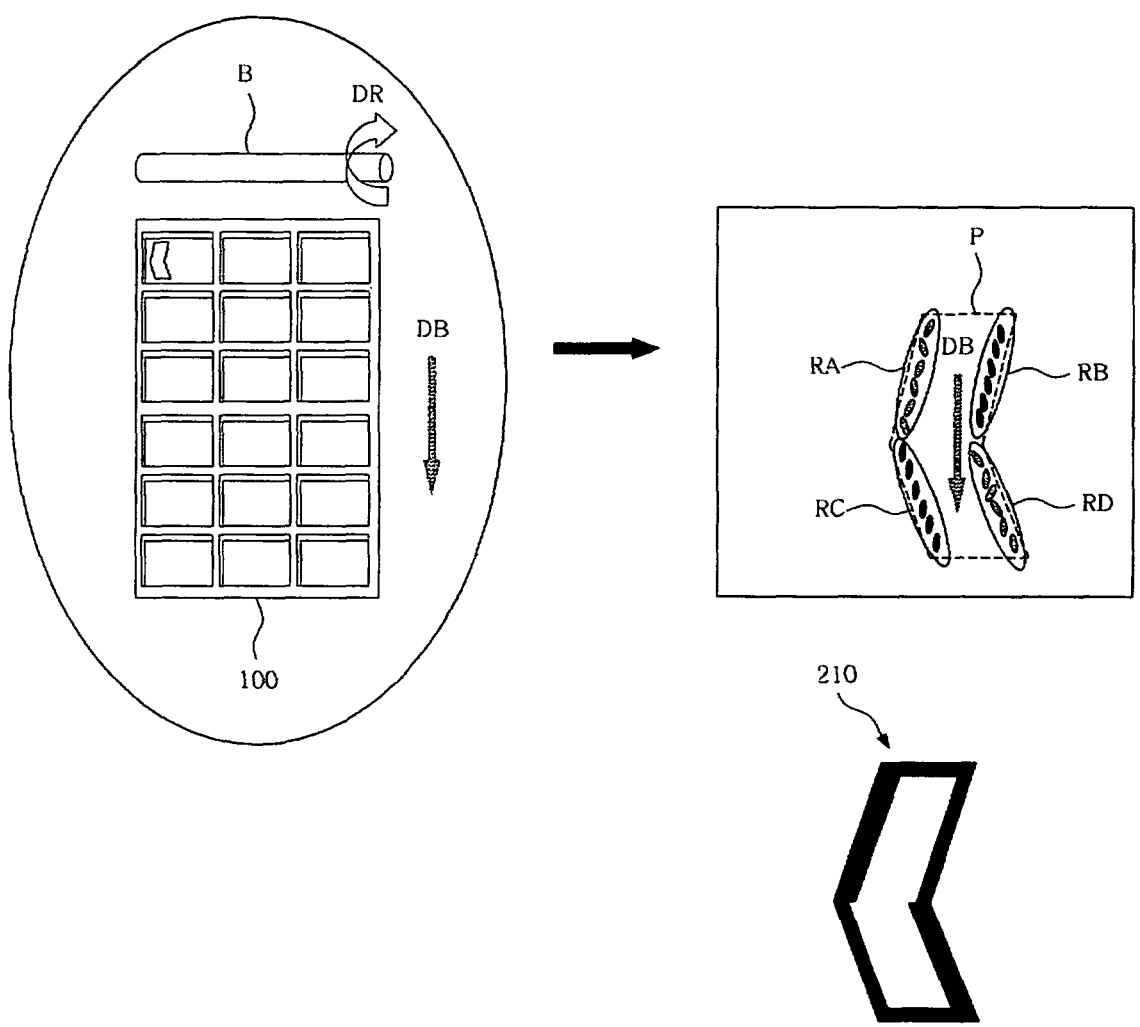
FIGS. 6 and 7 show views illustrating a rubbing step of FIG. 5.
Figure 7:
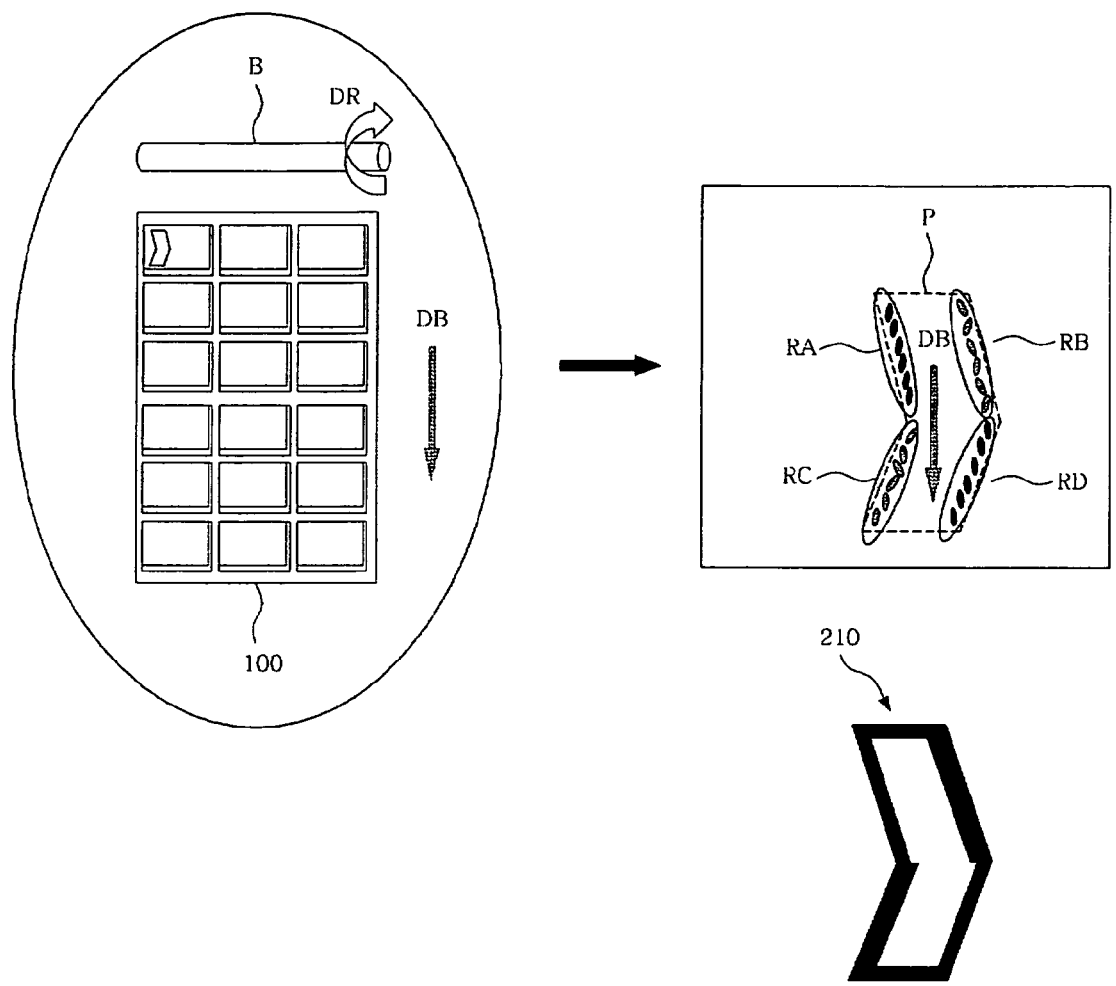

FIGS. 6 and 7 illustrate a rubbing step of FIG. 5, suggest a rubbing condition and show an example of the black matrix 210 that depends on the suggested rubbing condition and the structure of the pixel area P.

FIG. 6 shows a TFT array substrate direction, a rubbing advancing direction DB, and a rubbing rotational direction DR, which are arranged in a direction of the TFT array substrate 100 in which pixel areas P are formed. An excessive twist of liquid crystal arrangement generates due to a rubbing failure in the upper left area RA and the down right area RD in which rubbing hair on a surface of the rubbing bar B sweeps down a step of the pixel area P, so that light leakage is excessive in a step of the pixel area P.

The twist of liquid crystal arrangement is minimized because rubbing processing is performed well in the upper right area RB and a down left area RC, in which the rubbing hair on a surface of the rubbing bar B sweeps up a step of the pixel area P, so that there is little or no light leakage.

Compared with FIG. 6, FIG. 7 is equivalent to FIG. 6 in the rubbing advancing direction DB and the rubbing rotational direction DR, but FIG. 7 is different from FIG. 6 in that the TFT array substrate direction is rotated by about 180°.

FIG. 7 shows the setting of a TFT array substrate direction, a rubbing advancing direction DB, and a rubbing rotational direction DR, which are arranged in the direction of the TFT array substrate 100. An excessive twist of the liquid crystal arrangement generates due to rubbing failure in the upper right area RB and the down left area RC in which the rubbing hair on a surface of the rubbing bar B sweeps down a step of the pixel area P, so that light leakage is excessive in a step of the pixel area p.

In FIG. 7, the twist of liquid crystal arrangement is minimized because the rubbing processing is performed well in the upper left area RA and the down right area RD, in which the rubbing hair on a surface of the rubbing bar B sweeps up a step of the pixel area P, so that there is little or no light leakage, i.e., the light leakage is minimized.

That is, with the same rubbing conditions as FIG. 6, the upper left area RA and the down right area RD are portions in which light leakage is excessive, and in the same rubbing condition as FIG. 7, it can be estimated that the upper right area RB and the down left area RC are portions in which light becomes excessive.

In this way, if an arrangement direction of the TFT array substrate 100 in which pixel areas P are formed, and a rubbing condition such as a rubbing advancing direction DB and a rubbing rotational direction DR are known, then a position of light leakage can be seen depending on the step structure of the pixel area P. Accordingly, an asymmetrical light leakage position can be estimated and the line width is reduced or just maintained in a place where light leakage is minimal and the line width is expanded in a place where light leakage is excessive.

As described above, in an in-plane switching mode liquid crystal display according to an embodiment, it is estimated that a place in which light leakage is excessive and a place in which light leakage is minimal, depending on the structure of a pixel area and rubbing conditions. Accordingly, by expanding the line width of the black matrix in a place where light leakage is strongly generated and reducing or just maintaining the line width of the black matrix in a place where light leakage is minimal, the decrease of aperture ratio minimizes and light leakage prevention maximizes, whereby the contrast ratio can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An in-plane switching mode liquid crystal display comprising:
    a TFT array substrate comprising a data line, a pixel electrode and a common electrode, and the data line, the pixel electrode and the common electrode have at least one bent structure;
    a color filter array substrate opposite to the TFT array substrate, the color filter array substrate comprising a black matrix covering an area corresponding to at least the data line and the common electrode; and
    a liquid crystal layer formed between the TFT array substrate and the color filter array substrate,
    wherein the black matrix comprises two first black matrix lines covering an area where light leakage is minimal, and two second black matrix lines covering an area where light leakage is excessive, the second black matrix lines having a line width larger than the line widths of the first black matrix lines,
    wherein the area where light leakage is minimal and the area where light leakage is excessive are formed by the bent structure of the common electrode, and
    wherein one of the two first black matrix lines and one of the two second black matrix lines are connected with a predetermined angle to be opposite to each other and to be asymmetrical with respect to each other, and one of the two first black matrix lines and the other of the two second black matrix lines are disposed in parallel.

2. The in-plane switching mode liquid crystal display of claim 1, wherein the area where light leakage is excessive is previously estimated depending on a loading direction of the TFT array substrate and a rotational direction and a movement direction of a rubbing bar.

3. The in-plane switching mode liquid crystal display of claim 1, wherein the area where light leakage is excessive is a portion where the liquid crystal layer is non-uniformly aligned as a rubbing hair sweeps down a step of an opening area in the pixel area.

4. The in-plane switching mode liquid crystal display of claim 1, wherein the area where light leakage is minimal is a portion where the liquid crystal layer is uniformly aligned as a rubbing hair sweeps up a step of the pixel area.

5. The in-plane switching mode liquid crystal display of claim 1, wherein a line width of the second black matrix line is expanded to an inside of the pixel area, compared to the line width of the first black matrix line.

6. The in-plane switching mode liquid crystal display of claim 1, wherein the TFT array substrate comprises
    a first transparent insulating substrate;
    a gate line formed over the first transparent insulating substrate;
    a data line intersecting the gate line and having at least one bent structure;
    a common line disposed apart from and in parallel to the gate line;

a common electrode branched from the common line and having at least one bent structure to be parallel to the data line;

a thin film transistor positioned at an intersection of the gate line and the data line, the thin film transistor having a gate electrode, a semiconductor layer, a source electrode, and a drain electrode;

a pixel electrode alternately disposed with the common electrode, the pixel electrode having at least one bent structure and connected to the drain electrode; and a first alignment layer covering an entire surface of the first transparent substrate and where a rubbing processing is performed.

7. The in-plane switching mode liquid crystal display of claim 1, wherein the color filter array substrate comprises a second transparent insulating substrate;

a black matrix formed over the second transparent insulating substrate to block light, wherein and the black matrix comprises the first and second black matrix lines;

a color filter over a pixel area that is defined by the black matrix; and a second alignment layer covering an entire surface of the second transparent insulating substrate and where a rubbing processing is performed.

8. An in-plane switching mode liquid crystal display comprising:

first and second transparent insulating substrates opposing each other;

a gate line over the first transparent insulating substrate;

a data line intersecting the gate line, the data line having at least one bent structure;

a common line disposed apart from and in parallel to the gate line;

a common electrode branched from the common line, the common electrode having at least one bent structure parallel to the data line;

a thin film transistor positioned at an intersection of the gate line and the data line, the thin film transistor having a gate electrode, a semiconductor layer, a source electrode, and a drain electrode;

a pixel electrode alternately disposed with the common electrode, the pixel electrode having at least one bent structure, the pixel electrode being connected to the drain electrode;

a black matrix formed over the second transparent insulating substrate to block light;

a color filter over a pixel area that is defined by a black matrix;

first and second alignment layers covering an entire surface of the first and second transparent insulating substrates and where a rubbing processing is performed; and a liquid crystal layer between the first and second transparent insulating substrates, wherein the black matrix comprises two first black matrix lines covering an area where light leakage is minimal, and two second black matrix lines covering an area where light leakage is excessive, the second black matrix lines having a line width larger than the line widths of the first black matrix lines, wherein the area where light leakage is minimal and the area where light leakage is excessive are formed by the bent structure of the common electrode, and wherein one of the two first black matrix lines and one of the two second black matrix lines are connected with a predetermined angle to be opposite to each other and to be asymmetrical with respect to each other, and one of the two first black matrix lines and the other of the two second black matrix lines are disposed in parallel.

9. The in-plane switching mode liquid crystal display of claim 8, wherein the area where light leakage is excessive is previously estimated depending on a loading direction of the TFT array substrate and a rotational direction and a movement direction of a rubbing bar.

10. The in-plane switching mode liquid crystal display of claim 8, wherein a line width of the second black matrix line is expanded to an inside of the pixel area, compared to the line width of the first black matrix line.

11. A method for manufacturing an in-plane switching mode liquid crystal display, the method comprising:

forming a TFT array substrate where each of a side line and a data line of each of a pixel electrode and a common electrode have at least one bent structure;

forming a color filter array substrate comprising a black matrix opposing the TFT array substrate and defines a pixel area corresponding to the bent structure, wherein the black matrix comprises two first black matrix lines covering an area where light leakage is minimal, and two second black matrix lines covering an area where light leakage is excessive, the second black matrix lines having a line width larger than the line width of the first black matrix lines, wherein the area where light leakage is minimal and the area where light leakage is excessive are formed by the bent structure of the common electrode, wherein one of the two first black matrix lines are and one of the two second black matrix lines are connected with a predetermined angle to be opposite to each other and to be asymmetrical with respect to each other, and one of the two first black matrix lines and the other of the two second black matrix lines are disposed in parallel; and forming a liquid crystal layer between the TFT array substrate and the color filter array substrate and assembling the two substrates.

12. The method of claim 11, wherein the forming of the TFT array substrate comprises:

forming a gate line in one direction on a first transparent insulating substrate;

forming a common line disposed apart from and in parallel to the gate line and a common electrode branched from the common line, the common line having at least one bent structure;

forming the data line disposed parallel to the common electrode while intersecting the gate line;

forming a thin film transistor at an intersection of the gate line and the data line;

forming a pixel electrode alternately disposed with the common electrode, the pixel electrode being connected to the drain electrode; and forming a first alignment layer covering an entire surface of the first transparent insulating substrate; and performing a rubbing process on the first alignment layer.

13. The method of claim 11, wherein the forming of the color filter array substrate comprises:

forming a black matrix comprising the first and second black matrix lines over a second transparent insulating substrate;

forming a color filter over the second transparent insulating substrate; and forming a second alignment layer over an entire surface of the second transparent insulating substrate; and performing a rubbing processing on the second alignment layer.

14. The method of claim 11, wherein positions of the first black matrix line and the second black matrix line determine a loading direction of the TFT array substrate, based on a rubbing movement direction and a rubbing rotational direction of a rubbing bar.

15. The method of claim 14, wherein the second black matrix line corresponds to an area where a rubbing hair sweeps down depending on the rubbing movement direction and the rubbing rotational direction among steps of the pixel area where the common electrode is formed.

16. The method of claim 14, wherein the first black matrix line is in an area where a rubbing hair sweeps up depending on the rubbing movement direction and the rubbing rotational direction among steps of the pixel area.

17. The method of claim 11, wherein the line width of the second black matrix line is expanded to an inside of the pixel area, compared to the line width of the first black matrix line.

\* \* \* \* \*